(12) United States Patent
Jang et al.

(10) Patent No.: US 9,461,516 B2
(45) Date of Patent: Oct. 4, 2016

(54) FAN MOTOR

(71) Applicant: NEW MOTECH CO., LTD., Gwangju (KR)

(72) Inventors: Jeong Cheol Jang, Gwangju (KR); Gyeong Su Park, Gwangju (KR); Woo Sung Cho, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 93 days.

(21) Appl. No.: 14/324,257

(22) Filed: Jul. 7, 2014

(65) Prior Publication Data

US 2015/0076934 A1 Mar. 19, 2015

(30) Foreign Application Priority Data

Sep. 13, 2013 (KR) .......................... 10-2013-0110192

(51) Int. Cl.
*H02K 5/16* (2006.01)
*H02K 5/08* (2006.01)
*H02K 5/10* (2006.01)
*H02K 5/167* (2006.01)

(52) U.S. Cl.
CPC *H02K 5/08* (2013.01); *H02K 5/10* (2013.01); *H02K 5/1672* (2013.01); *H02K 11/30* (2016.01); *H02K 2211/03* (2013.01)

(58) Field of Classification Search
CPC .......... H02K 5/10; H02K 5/08; H02K 11/30; H02K 5/1672
USPC ............. 310/400, 406, 407, 410, 67 R, 68 D
See application file for complete search history.

(56) References Cited

U.S. PATENT DOCUMENTS

| | | | | |
|---|---|---|---|---|
| 5,061,868 A | * | 10/1991 | Iwazaki | F16J 15/43 |
| | | | | 310/67 R |
| 5,327,064 A | * | 7/1994 | Arakawa | H02K 29/08 |
| | | | | 307/117 |
| 5,577,152 A | * | 11/1996 | Chen | H02P 6/085 |
| | | | | 318/400.13 |
| 6,069,421 A | * | 5/2000 | Smith | H02K 5/128 |
| | | | | 29/596 |
| 6,577,031 B2 | | 6/2003 | Morooka et al. | |
| 6,943,471 B2 | | 9/2005 | Toyokawa et al. | |
| 7,102,318 B2 | * | 9/2006 | Miura | H02K 11/33 |
| | | | | 318/400.4 |
| 7,884,512 B2 | * | 2/2011 | Horng | B23K 1/0016 |
| | | | | 310/237 |
| 8,608,463 B2 | * | 12/2013 | Huang | F04D 25/0693 |
| | | | | 310/68 R |

(Continued)

FOREIGN PATENT DOCUMENTS

| JP | 04-054470 U | 5/1992 |
|---|---|---|
| JP | 05-149509 A | 6/1993 |

(Continued)

*Primary Examiner* — Naishadh Desai
(74) *Attorney, Agent, or Firm* — Revolution IP, PLLC (57) ABSTRACT

Disclosed herein is a fan motor including: a first bracket having a central portion through which a rotary shaft penetrates, the first bracket having an upper bearing insertion space which is formed in the first bracket and to which an upper bearing for supporting the upper end portion of the rotary shaft is inserted; a second bracket having an upper side to which the first bracket is connected, the second bracket having a lower bearing insertion space which is formed at the central portion of the lower side thereof and to which a lower bearing for supporting the lower end portion of the rotary shaft is inserted; a printed circuit board inserted and fixed into a PCB insertion space formed in the lower side of the second bracket; and a third bracket having an upper side to which the second bracket is connected.

10 Claims, 5 Drawing Sheets

(56) References Cited

U.S. PATENT DOCUMENTS

| | | | |
|---|---|---|---|
| 8,829,746 B2* | 9/2014 | Yamasaki | B62D 5/0406 310/110 |
| 2003/0117029 A1* | 6/2003 | Horng | H02K 3/47 310/89 |
| 2003/0222522 A1* | 12/2003 | Chang | F04D 29/063 310/90 |
| 2009/0189492 A1* | 7/2009 | Horng | H02K 1/185 310/67 R |
| 2010/0019629 A1* | 1/2010 | Amaya | D06F 7/065 310/68 R |
| 2011/0037328 A1* | 2/2011 | Jang | F04D 25/08 310/43 |
| 2012/0080970 A1* | 4/2012 | Yin | F04D 13/086 310/87 |

FOREIGN PATENT DOCUMENTS

| | | |
|---|---|---|
| JP | 07-009065 U | 2/1995 |
| JP | 2001-128417 A | 5/2001 |
| JP | 2004-028174 A | 1/2004 |
| JP | 2010-246203 A | 10/2010 |
| JP | 2010-263768 A | 11/2010 |
| JP | 2013-074725 A | 4/2013 |
| JP | 2013-106409 A | 5/2013 |
| KR | 10-0511324 B1 | 8/2005 |
| KR | 10-2008-0105795 A | 12/2008 |
| KR | 10-2009-0087720 A | 8/2009 |
| KR | 10-2011-0048663 A | 5/2011 |
| KR | 10-1074935 B1 | 10/2011 |
| KR | 10-2012-0002879 A | 1/2012 |

* cited by examiner

FAN MOTOR

CROSS REFERENCE TO PRIOR APPLICATIONS

This application claims priority under 35 U.S.C. §119 to Korean Patent Application No. KR 10-2013-0110192 filed on Sep. 13, 2013, which is hereby incorporated by reference in its entirety.

BACKGROUND OF THE INVENTION

1. Field of the Invention

The present invention relates to a fan motor, and more particularly, to a fan motor which can reduce manufacturing costs because a manufacturing process is simple and can effectively prevent penetration of moisture from the outside.

2. Background Art

In general, a motor used for blowing cold air of a refrigerator or circulating inside air and outside air of a device is called a fan motor. Such a fan motor is mainly installed under humid atmospheres or under environment that dew condensation is formed by changes in temperature. Therefore, because the motor may be out of order due to penetration of moisture into the motor, various studies on a structure for preventing penetration of moisture have been made.

Korean Patent Nos. 10-0511324 and 10-1074935 and U.S. Pat. No. 6,577,031 disclose technology to manufacture a motor housing by resin insert molding together with a stator of a motor and a printed circuit board. According to the above-mentioned conventional inventions, because the motor housing is manufactured by resin molding in such a manner that the stator and the printed circuit board are embedded in the motor housing, the motor housing has an effective structure to prevent penetration of moisture into the motor.

However, the conventional inventions to manufacture the motor by insert molding have a problem in that they require lots of processes and expenses necessary for insert molding because a mold for insert molding must be manufactured. Moreover, the conventional inventions have difficulty in automation of all processes because it must pass an insert molding process.

Therefore, in order to solve the above-mentioned problems, the inventors of the present invention propose a new structure of a fan motor which utilizes a structure that a stator is located inside a bracket and a printed circuit board is mounted outside the bracket to be sealed and which is manufactured at low costs by improving the structure of the housing.

SUMMARY OF THE INVENTION

Accordingly, the present invention has been made to solve the above-mentioned problems occurring in the prior arts, and it is an object of the present invention to provide a fan motor of a new structure.

It is another object of the present invention to provide a fan motor which can lower manufacturing costs because insert molding for manufacturing a motor housing is not applied.

It is a further object of the present invention to provide a fan motor which can automate all of manufacturing processes because insert molding for manufacturing the motor housing is not applied.

It is a still further object of the present invention to provide a fan motor which can reduce manufacturing costs because just a part of a bracket is made of a flame-resistant material.

The above and other objects, features and advantages of the present invention will be apparent from the following detailed description of the preferred embodiments of the invention in conjunction with the accompanying drawings.

To accomplish the above object, according to the present invention, there is provided a fan motor including: a first bracket having a central portion through which a rotary shaft penetrates, the first bracket having an upper bearing insertion space which is formed in the first bracket and to which an upper bearing for supporting the upper end portion of the rotary shaft is inserted; a second bracket having an upper side to which the first bracket is connected, the second bracket having a lower bearing insertion space which is formed at the central portion of the lower side thereof and to which a lower bearing for supporting the lower end portion of the rotary shaft is inserted; a printed circuit board (PCB) inserted and fixed into the upper side of the second bracket; and a third bracket having an upper side to which the second bracket is connected.

In another aspect of the present invention, there is provided a fan motor including: a first bracket having a central portion through which a rotary shaft penetrates, the first bracket having an upper bearing insertion space which is formed in the first bracket and to which an upper bearing for supporting the upper end portion of the rotary shaft is inserted; a second bracket having an upper side to which the first bracket is connected, the second bracket having a lower bearing insertion space which is formed at the central portion of the lower side thereof and to which a lower bearing for supporting the lower end portion of the rotary shaft is inserted; a printed circuit board inserted and fixed into a PCB insertion space formed in the lower side of the second bracket; and a third bracket having an upper side to which the second bracket is connected.

Here, the second bracket is made of a flame-proof resin material in order to prevent fire and the third bracket is made of a plastic material.

Furthermore, the second bracket includes a plurality of flange parts which protrude from the outer rim of the upper side thereof and the third bracket includes a plurality of seating grooves which are formed in the upper side thereof and to which the flange parts are respectively inserted, and each of the flange parts and each of the seating grooves respectively have screw holes for bolt coupling.

Additionally, in case that the printed circuit board is connected to the lower side of the second bracket, the second bracket includes a coil path part through which the coil wound on the stator passes the second bracket and is connected to the printed circuit board.

According to the present invention, the fan motor can lower manufacturing costs and automate all of manufacturing processes because insert molding for manufacturing the motor housing is not applied, and reduce manufacturing costs because just a part of a bracket is made of a flame-resistant material.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiments of the present invention with reference to the attached drawings. In the drawings, the same components have the same reference numerals even though they are illustrated in different figures, and repeated description of the same components will be omitted.

Figure 1:
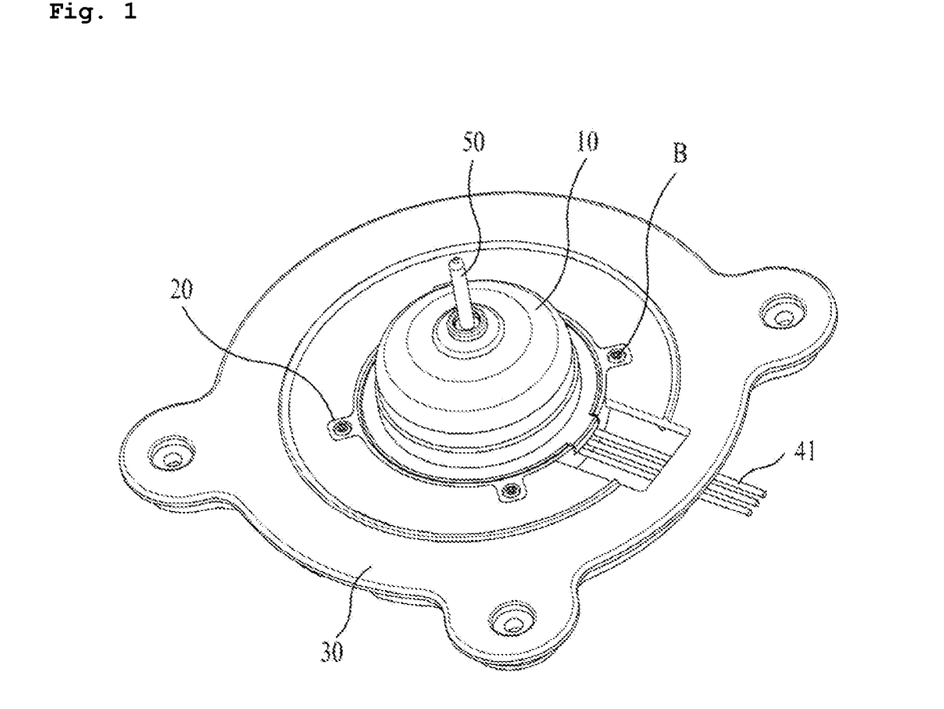
FIG. 1 is a perspective view of a fan motor according to a preferred embodiment of the present invention.
Figure 2:
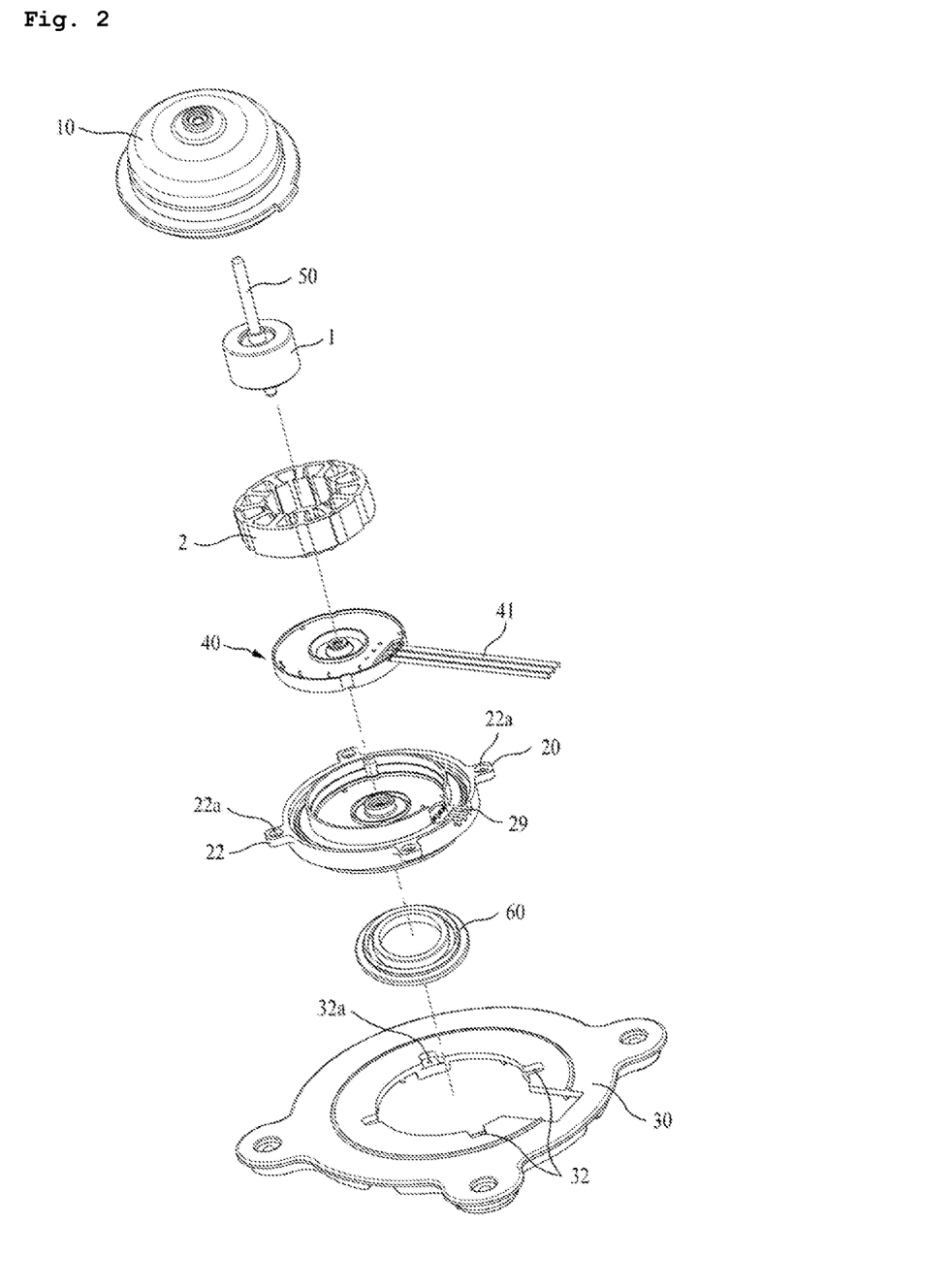
FIG. 2 is an exploded perspective view of the fan motor according to the preferred embodiment of the present invention.

FIG. 1 is a perspective view of a fan motor according to a preferred embodiment of the present invention, and FIG. 2 is an exploded perspective view of the fan motor according to the preferred embodiment of the present invention.

As shown in FIGS. 1 and 2, the fan motor according to the preferred embodiment of the present invention includes a first bracket 10, a second bracket 20, a third bracket 30, a printed circuit board (PCB) 40, and a rotary shaft 50.

The first bracket 10 and the second bracket 20 are made by plastic injection molding and have a structure that they are connected with each other and sealed by ultrasonic fusion, and the second bracket 20 and the third bracket 30 are screw-coupled with each other by bolts B.

A rotor 1, a stator 2, the printed circuit board 40 and the rotary shaft 50 are located inside the first and second brackets 10 and 20 which are connected with each other by ultrasonic fusion.

Figure 3:
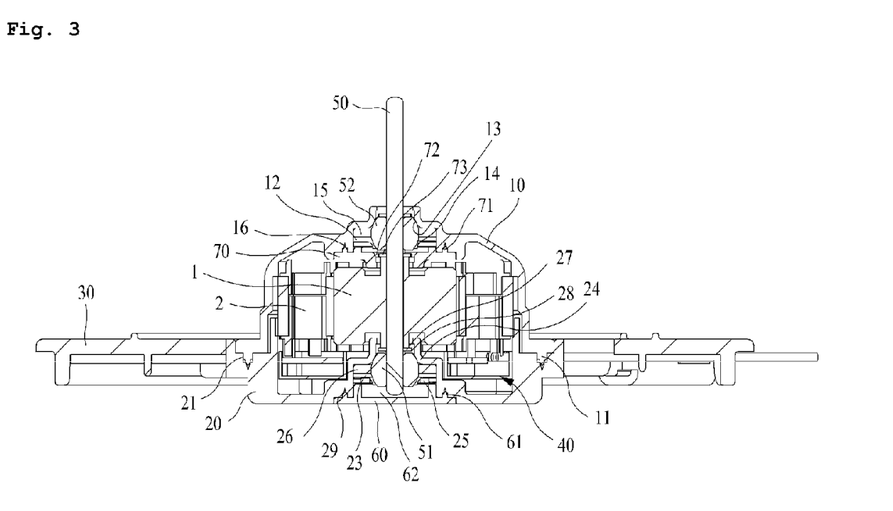
FIG. 3 is a sectional view of a cut part of the fan motor according to the preferred embodiment of the present invention.

FIG. 3 is a sectional view of a cut part of the fan motor according to the preferred embodiment of the present invention.

In more detail, as shown in FIG. 3, the fan motor according to the preferred embodiment of the present invention has a motor housing formed by the first bracket 10, the second bracket 20 and the third bracket 30 which are connected with each other as described above.

The first bracket 10 and the second bracket 20 are connected with each other by ultrasonic fusion. For the ultrasonic fusion, a first fusion groove 21 is formed in the upper face of the second bracket 20, and a first fusion protrusion 11 is formed on the lower face of the first bracket 10 at a position corresponding to the first fusion groove 21 of the second bracket 20.

Therefore, when ultrasonic waves are applied to the first fusion protrusion 11 to heat the first fusion protrusion 11 after the first fusion protrusion 11 is inserted into the first fusion groove 21, the first fusion protrusion 11 is melted and adhered to the first fusion groove, and hence, the insides of the first and second brackets 10 and 20 are sealed. Of course, the fusion groove may be formed on the lower face of the first bracket 10 and the fusion protrusion may be formed on the upper face of the second bracket 20.

Furthermore, the second bracket 20 and the third bracket 30 are screw-coupled with each other by the bolts (B) (See FIG. 1), and as shown in FIG. 2, a plurality of flange parts 22 protrude from the outer rim of the upper side of the second bracket 20, and a plurality of seating grooves 32 to which the flange parts 22 are inserted are formed in the upper side of the third bracket 30.

Screw holes 22a and 32a for bolt coupling are respectively formed in the flange parts 22 and the seating grooves 32. When bolts B are coupled to the screw holes 22a and 32a after the flange parts 22 are inserted into the seating grooves 32, the second bracket 20 is screw-coupled to the upper side of the third bracket 30.

Here, as described above, because the first bracket 10 is joined to the second bracket 20 by ultrasonic fusion, it is preferable that the second bracket 20 be made of a flame-proof resin material in order to prevent fire because many devices, such as the rotor 1, the stator 2 and the printed circuit board 40, which generate heat when they are operated are accommodated in the second bracket 20. Of course, the third bracket 30 also may be made of a flame-proof resin material, but because the flame-proof resin material is very expensive, it is preferable that just the second bracket 20 be made of the flame-proof resin material and the third bracket 30 is made of a general plastic material which is inexpensive.

The rotary shaft 50 is located by passing through the central portions of the first bracket 10 and the second bracket 20. The lower end portion of the rotary shaft 50 is supported in rotation by a lower bearing 51, and the upper end portion is supported in rotation by an upper bearing 52 which is located inside the central portion of the first bracket 10.

The lower bearing 51 is located in a lower bearing insertion space 23 formed at the central portion of the lower side of the second bracket 20, and the upper portion of the lower bearing 51 is forcedly pressed and fixed to a lower bearing pressing part 24 which is formed on the upper portion of the central portion of the lower bearing insertion space 23. The lower portion of the lower bearing 51 is supported by a lower board push 25.

A lower felt 26 for supplying oil which is lubricating oil to support rotation of the bearing is mounted on the outer circumferential surface of the lower bearing 51. Furthermore, a lower oil return washer insertion part 27 is formed on the upper portion of the lower bearing pressing part 24, and a lower oil return washer 28 is inserted into the lower oil return washer insertion part 27 in order to prevent oil from flowing out of the upper portion of the lower bearing 51.

The lower bearing insertion space 23 of the second bracket 20 in which the lower bearing 51 is located is covered sealed and joined by a lower bearing cover 60. For this, a second fusion groove 29 is formed in the lower side of the second bracket 20, and a second fusion protrusion 61 is formed on the upper side of the lower bearing cover 60 at a position corresponding to the second fusion groove 29.

After the second fusion protrusion 61 is inserted into the second fusion groove 29, when ultrasonic waves are applied to the second fusion protrusion 61 to heat the second fusion protrusion 61, the second fusion protrusion 61 is melted and adhered to the second fusion groove 29. Therefore, the lower bearing cover 60 is joined to the lower side of the second bracket 20 so as to isolate the lower bearing insertion space 23 from the outside, and hence, the present invention can prevent penetration of outside moisture. Of course, the fusion groove may be formed on the lower side of the second bracket 20 and fusion protrusion may be formed on the upper side of the lower bearing cover 60.

As described above, when the lower bearing cover 60 is joined to the lower side of the second bracket 20, an end of the rotary shaft 50 penetrating the central portion of the second bracket 20 is located in a space part 62 formed inside the central portion of the bearing cover 60.

The upper bearing 52 is inserted into an upper bearing insertion space 12 of the first bracket 10, and is forcedly pressed and fixed to an upper bearing pressing part 13 formed inside the central portion of the first bracket 10. The lower portion of the upper bearing 51 is supported by an upper board push 14.

An upper felt 15 is located on the outer circumferential surface of the upper bearing 52, and the upper felt 15 contains oil for promoting rotation of the bearing. The upper bearing insertion space 12 which is a space to which the upper bearing 52 is inserted is sealed and covered by an upper bearing cover 70.

For this, a third fusion groove 16 is formed at the central portion of the inner face of the first bracket 10, and an upper fusion protrusion 71 is formed on the upper bearing cover 70 at a position corresponding to the third fusion groove 16. The upper fusion protrusion 71 is melted, sealed and adhered to the third fusion groove 16 by ultrasonic fusion. Of course, the upper fusion protrusion 71 may be formed in a shape of the fusion groove and the third fusion groove 16 may be formed in a shape of the fusion protrusion.

An upper oil return washer insertion part 72 is formed inside the central portion of the upper bearing cover 70. An upper oil return washer 73 is inserted into the upper oil return washer insertion part 72 in order to prevent an oil leakage to the upper portion of the upper bearing 52.

In the fan motor according to the preferred embodiment of the present invention, the motor housing is completely assembled when the second bracket 20 is screw-coupled to the third bracket 30, the printed circuit board 40, the stator 2 and the rotor 1 are located on the second bracket 20, and the first bracket 10 is fused to the second bracket 20 with ultrasonic waves.

Therefore, the fan motor according to the preferred embodiment of the present invention is more convenient in manufacturing process than the conventional inventions to form the motor housing by insert injection molding and can reduce manufacturing costs. Additionally, in consideration of the risk of fire, the second bracket 20 which includes many devices, such as the rotor 1, the stator 2 and the printed circuit board 40, generating heat when they are operated is made of a flame-proof resin material which is relatively expensive, and the third bracket 30 is made of a general plastic material which is relatively inexpensive.

Figure 4:
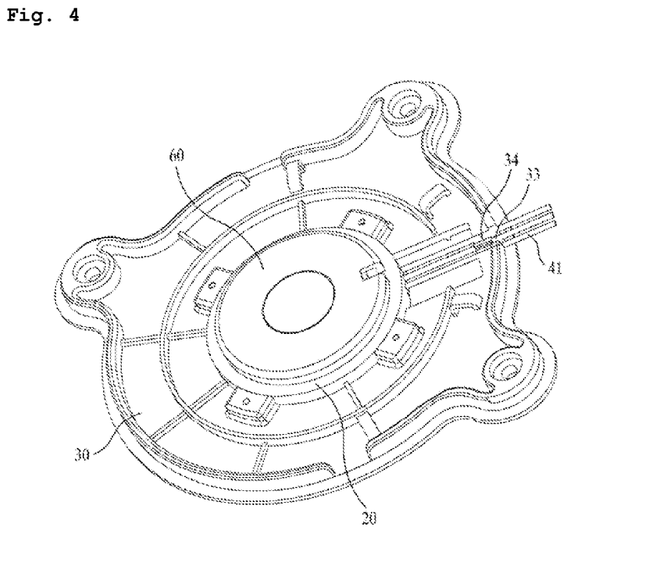
FIG. 4 is a perspective view showing a structure of a lower side of the fan motor according to the preferred embodiment of the present invention.

FIG. 4 is a perspective view showing a structure of a lower side of the fan motor according to the preferred embodiment of the present invention.

In the meantime, a wire 41 for connecting the printed circuit board 40 with an external power supply is mounted on the printed circuit board 40. As shown in FIG. 4, the wire 41 passes through the upper side of the second bracket 20 and the lower side of the third bracket 30 and extends to the outside.

In this instance, in order to extend the wire 41 to the outside stably and to prevent twisting of the wire 41, the second bracket 20 has a wire groove 29 (See FIG. 2) formed in the outer rim portion of the upper side thereof, and the third bracket 30 has a wire passing hole 33 formed at one side of the lower side thereof for allowing the wire 41 to pass.

Additionally, the third bracket 30 further has a wire holder 34 mounted on the lower side thereof for holding the wire 41 to prevent the wire 41 from deviating from the position by an external shock. In this instance, the wire 41 passing the lower side of the third bracket 30 is extended to the outside through the wire passing hole 33 in a state where it is fixed on the lower side of the third bracket 30 by the wire holder 34, and hence, it can prevent that the wire 41 deviates from the designated position or is twisted even though an external shock or vibration is applied.

The printed circuit board 40 is electrically connected to a coil (not shown) wound on the stator 2 located at the upper side inside the second bracket 20 in order to apply electricity to the stator 2 to thereby operate the motor.

Figure 5:
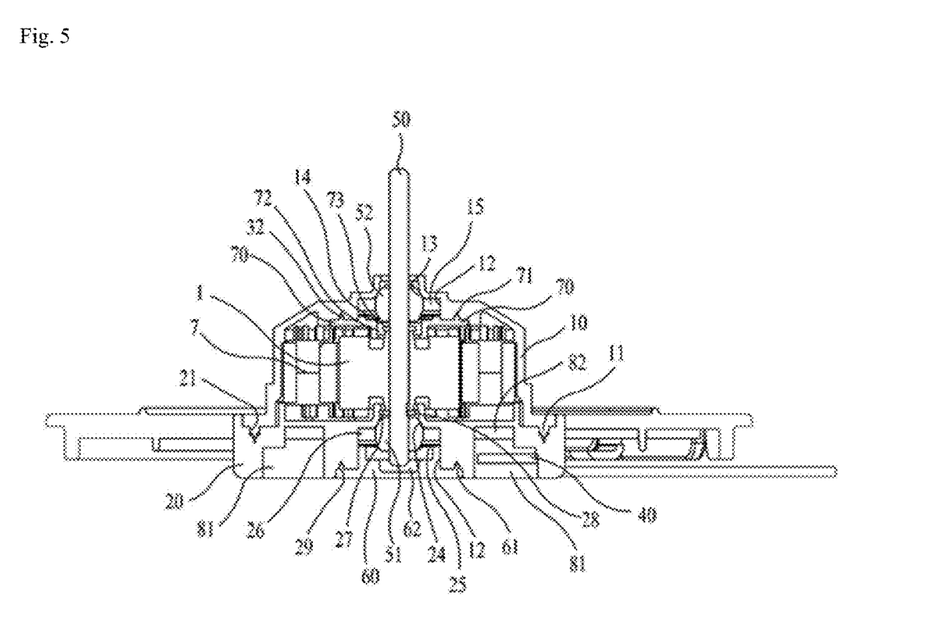
FIG. 5 is a sectional view of a cut part of a fan motor according to another preferred embodiment of the present invention.
Figure 6:
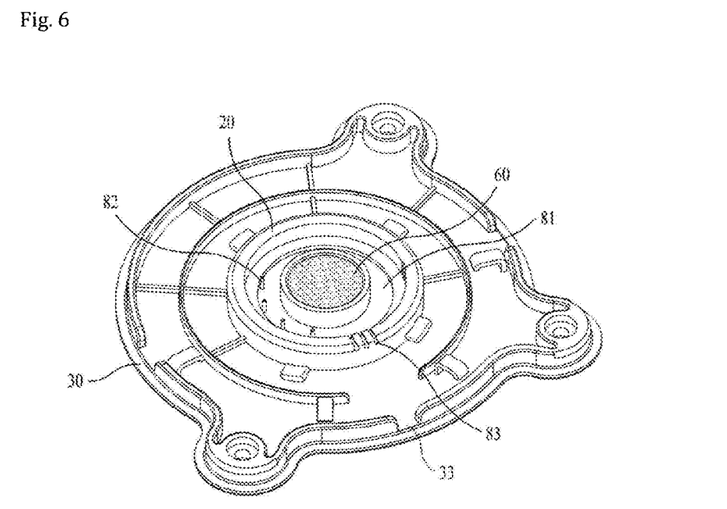
FIG. 6 is a perspective view showing a state before a printed circuit board is not mounted on a lower side of a second bracket.
Figure 7:
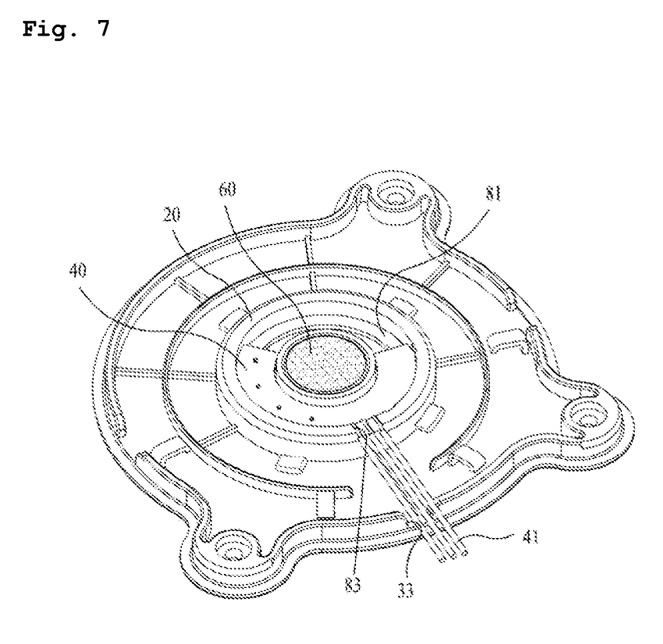
FIG. 7 is a perspective view showing a state where the printed circuit board is mounted on the lower side of the second bracket.
Figure 8:
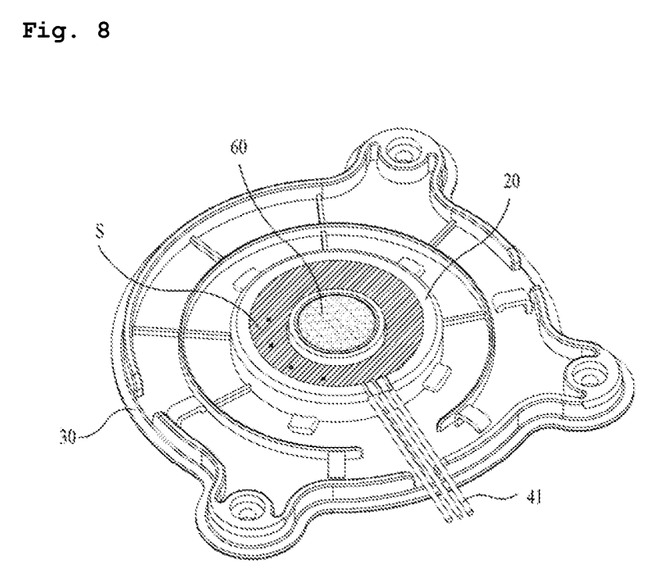
FIG. 8 is a view showing a state where a printed circuit board (PCB) insertion space formed in the lower side of the second bracket is filled with a sealing material.

FIG. 5 is a sectional view of a cut part of a fan motor according to another preferred embodiment of the present invention, FIG. 6 is a perspective view showing a state before a printed circuit board is not mounted on a lower side of a second bracket, FIG. 7 is a perspective view showing a state where the printed circuit board is mounted on the lower side of the second bracket, and FIG. 8 is a view showing a state where a printed circuit board (PCB) insertion space formed in the lower side of the second bracket is filled with a sealing material.

Meanwhile, as shown in FIGS. 5 to 7, the fan motor according to another preferred embodiment of the present invention includes the printed circuit board 40 which is mounted on the lower side of the second bracket 20. For this, a printed circuit board (PCB) insertion space 81 is formed in the lower side of the second bracket 20.

In this instance, because the printed circuit board 40 is exposed to the outside in a state where it is inserted into the PCB insertion space 81, when the printed circuit board 40 is inserted into the PCT insertion space 81 in order to fix the printed circuit board 40 stably and to prevent penetration of moisture from the outside, as shown in FIG. 8, the remaining space except a space where the printed circuit board 40 occupies in the PCB insertion space 81 is filled with a sealing material S.

As described above, in case that the printed circuit board 40 is mounted on the lower side of the second bracket 20, the motor housing is manufactured through the steps of locating the rotary shaft 50, the rotor 1 and the stator 2 are located on the second bracket 20, fusing and joining the first bracket 10 to the second bracket 20 by ultrasonic fusion, and joining the second bracket 20 to the third bracket 30 via bolts B. Therefore, the fan motor according to the preferred embodiment of the present invention is more convenient in manufacturing than the conventional inventions which form the motor housing by insert injection molding, and can reduce manufacturing costs.

In the meantime, when the printed circuit board 40 is mounted on the lower side of the second bracket 20, the coil (not shown) wound on the stator 2 passes the second bracket 20 and is electrically connected to the printed circuit board 40. For this, as shown in FIG. 6, a coil path part 82 through which the coil passes is formed in the second bracket 20. Therefore, the coil wound on the stator 2 gets out of the lower side of the second bracket 20 and is connected to the printed circuit board 40.

Moreover, when the printed circuit board 40 is mounted on the lower side of the second bracket 20, because the wire 41 connected to the printed circuit board 40 naturally passes the lower side of the second bracket 20, a guide groove 83 for promoting a stable mounting of the wire 41 and preventing twisting of the wire 41 is formed in the lower side of the second bracket 20. Of course, as described above, the third bracket 30 has the wire passing hole 33 formed in one side of the lower side thereof, and not shown in the drawing, but the wire holder 34 which is described above may be formed additionally.

While the present invention has been described with reference to the particular illustrative embodiment, it is not to be restricted by the embodiment but only by the appended claims. It will be understood by those skilled in the art that simple modifications and changes of the embodiments within the scope of the present invention belong to the scope of the present invention.

What is claimed is:

1. A fan motor comprising:
    a first bracket having a central portion through which a rotary shaft penetrates, the first bracket having an upper bearing insertion space which is formed in the first bracket and to which an upper bearing for supporting the upper end portion of the rotary shaft is inserted;
    a second bracket having an upper side to which the first bracket is connected, the second bracket having a lower bearing insertion space which is formed at the central portion of the lower side thereof and to which a lower bearing for supporting the lower end portion of the rotary shaft is inserted, the second bracket including a wire groove formed in an outer rim portion of an upper side of the second bracket;
    a printed circuit board (PCB) inserted and fixed into the upper side of the second bracket; and
    a third bracket having an upper side to which the second bracket is connected, the third bracket including a wire passing hole formed at one side of a lower side of the third bracket, wherein
    a wire is connected to the PCB and the wire groove of the second bracket makes the wire stably extending by preventing the wire from twisting, and the wire is passed through via the hole formed at the third bracket.

2. A fan motor comprising:
    a first bracket having a central portion through which a rotary shaft penetrates, the first bracket having an upper bearing insertion space which is formed in the first bracket and to which an upper bearing for supporting the upper end portion of the rotary shaft is inserted;
    a second bracket having an upper side to which the first bracket is connected, the second bracket having a lower bearing insertion space which is formed at the central portion of the lower side thereof and to which a lower bearing for supporting the lower end portion of the rotary shaft is inserted, the second bracket including a wire groove formed in an outer rim portion of an upper side of the second bracket;
    a printed circuit board inserted and fixed into a PCB insertion space formed in the lower side of the second bracket; and
    a third bracket having an upper side to which the second bracket is connected, the third bracket including a wire passing hole formed at one side of a lower side of the third bracket, wherein
    a wire is connected to the printed circuit board and the wire groove of the second bracket makes the wire stably extending by preventing the wire from twisting, and the wire is passed through via the hole formed at the third bracket.

3. The fan motor according to claim 1, wherein the second bracket is made of a flame-proof resin material in order to prevent fire and the third bracket is made of a plastic material.

4. The fan motor according to claim 1, wherein the first bracket includes a first protrusion which is formed on the lower side of the first bracket to be coupled with the second bracket, and wherein the second bracket includes a first groove which is formed in the upper side of the second bracket and to which the first protrusion inserted.

5. The fan motor according to claim 1, wherein the second bracket includes a plurality of flange parts which protrude from the outer rim of the upper side thereof and the third bracket includes a plurality of seating grooves which are formed in the upper side thereof and to which the flange parts are respectively inserted, and each of the flange parts and each of the seating grooves respectively have screw holes for bolt coupling.

6. The fan motor according to claim 1, wherein a wire for connecting the printed circuit board with an external power supply is mounted on the printed circuit board, and wherein the second bracket includes a guide groove formed in the lower side thereof in order to extend the wire stably and to prevent twisting of the wire, and the third bracket includes a wire passing hole formed at one side of the lower side thereof for allowing the wire to pass.

7. The fan motor according to claim 2, wherein the second bracket includes a coil path part through which the coil wound on the stator passes the second bracket and is connected to the printed circuit board.

8. The fan motor according to claim 2, wherein the second bracket is made of a flame-proof resin material in order to prevent fire and the third bracket is made of a plastic material.

9. The fan motor according to claim 2, wherein the first bracket includes a first protrusion which is formed on the lower side of the first bracket to be coupled with the second bracket, and wherein the second bracket includes a first groove which is formed in the upper side of the second bracket and to which the first protrusion inserted.

10. The fan motor according to claim 2, wherein the second bracket includes a plurality of flange parts which protrude from the outer rim of the upper side thereof and the third bracket includes a plurality of seating grooves which are formed in the upper side thereof and to which the flange parts are respectively inserted, and each of the flange parts and each of the seating grooves respectively have screw holes for bolt coupling.

* * * * *